(12) United States Patent
Thorp (10) Patent No.: US 11,884,096 B2
(45) Date of Patent: Jan. 30, 2024

(54) SKULL MOUNT

(71) Applicant: Loose Point Products, LLC, Brownsville, MN (US)

(72) Inventor: Justin Thorp, Brownsville, MN (US)

(73) Assignee: LOOSE POINT PRODUCTS, LLC, Brownsville, MN (US)

( * ) Notice: Subject to any disclaimer, the term of this patent is extended or adjusted under 35 U.S.C. 154(b) by 728 days.

(21) Appl. No.: 17/085,000

(22) Filed: Oct. 30, 2020

(65) Prior Publication Data

US 2021/0362538 A1 Nov. 25, 2021

Related U.S. Application Data

(60) Provisional application No. 63/027,366, filed on May 20, 2020.

(51) Int. Cl.
*B44C 5/02* (2006.01)
*F16M 11/22* (2006.01)
*F16M 13/02* (2006.01)

(52) U.S. Cl.
CPC .............. *B44C 5/02* (2013.01); *F16M 11/22* (2013.01); *F16M 13/02* (2013.01)

(58) Field of Classification Search
CPC .......... G09B 23/26; B44C 5/02; F16M 11/02; F16M 11/04; F16M 11/10
See application file for complete search history.

(56) References Cited

U.S. PATENT DOCUMENTS

| | | | | |
|---|---|---|---|---|
| 4,464,440 A | * | 8/1984 | Dotzman | B44C 5/02 434/296 |
| 7,243,888 B2 | * | 7/2007 | Peek | G09B 23/36 434/296 |
| D668,732 S | * | 10/2012 | Frecka | D22/115 |
| 9,454,917 B1 | * | 9/2016 | King | F16M 11/10 |
| D770,937 S | * | 11/2016 | Delgrosso | D11/135 |
| 9,610,798 B2 | * | 4/2017 | Allred | B44C 5/02 |
| 9,626,881 B1 | * | 4/2017 | Herron | B44C 5/02 |
| 10,035,374 B2 | * | 7/2018 | Martin | B44C 5/02 |
| 10,035,375 B1 | * | 7/2018 | Gifford | B44C 5/02 |
| 2006/0154224 A1 | * | 7/2006 | St.Ama | G09B 23/36 434/296 |
| 2009/0230260 A1 | * | 9/2009 | Damin | G09B 23/36 434/296 |

\* cited by examiner

*Primary Examiner* — Kurt Fernstrom
(74) *Attorney, Agent, or Firm* — Kinney & Lange, P. A.

(57) ABSTRACT

An arrowhead shaped skull mount is configured to support and display an attached animal trophy skull in a horizontal configuration and a vertical configuration. In the horizontal configuration, the trophy skull is attached to the skull mount and the skull mount is supported by a horizontal surface, such as a table or a mantle. In the vertical configuration, the trophy skull is attached to the skull mount and the skull mount is attached to a vertical surface, such as a wall or a post. The skull mount is configured to convert or switch between the horizontal configuration and the vertical configuration without altering the attachment method of the trophy skull to the skull mount.

27 Claims, 5 Drawing Sheets

SKULL MOUNT

CROSS-REFERENCE TO RELATED APPLICATION(S)

This application claims the benefit of U.S. Provisional Application No. 63/027,366 filed May 20, 2020 for "ARROWHEAD TABLE/WALL TROPHY SKULL MOUNT" by J. Thorp, which is incorporated by reference herein in its entirety.

BACKGROUND

The present disclosure relates to a taxidermy mounting system, and more particularly to a convertible trophy skull mount.

Taxidermy or trophy skull mounts are used to display horns, antlers, and life-like taxidermied animals in a three-dimensional fashion displaying the physical characteristics of an animal. There are a variety of mounting systems available that are designed to mount and display trophy skulls in either a vertical orientation (e.g. attached to a wall) or a horizontal orientation (e.g. resting on a table or a mantle). Further, some mounting systems allow a user to convert from a vertical orientation to a horizontal orientation by altering how the trophy skull is attached to the mounting system. There is currently not a mounting system that allows a user to convert from a vertical orientation to a horizontal orientation without altering how the trophy skull is attached to the mounting system.

SUMMARY

According to one aspect of the disclosure, a skull mount includes a body, a support, and a base. The body has a triangular shape and includes a first edge, a second edge, and a third edge, and a bracket extending from the third edge of the body. The support has a triangular shape and includes a first edge, a second edge, a third edge, and an attachment feature that extends from the first edge of the support. Further, the third edge of the support is coupled to the body. The base includes a first edge, a second edge, a third edge, and the second edge of the base is coupled to the body.

According to another aspect of the disclosure, a broadhead arrow shaped skull mount for supporting an animal skull is disclosed. The skull mount comprises a body, a support, a base, an attachment feature, and a bracket. The body includes a first edge, a second edge, a third edge, a first surface, and a second surface. The first surface and the second surface are positioned opposite each other with respect to a plane extending through a center of a thickness of the body. The support includes a first edge, a second edge, and a third edge, with the third edge of the support coupled to the first surface of the body. The base includes a first edge, a second edge, and a third edge, with the second edge of the base coupled to the second surface of the body. The attachment feature extends outwards from the first edge of the support and the attachment feature is configured to secure the animal skull to the skull mount. The bracket extends outwards from the third edge of the body. A center plane of the support and a center plane of the base are in-line with a center plane of the body. The center plane of the body extends from a middle of the third edge of the body to a point formed by an intersection of the first edge and second edge of the body.

DETAILED DESCRIPTION

Figure 1:
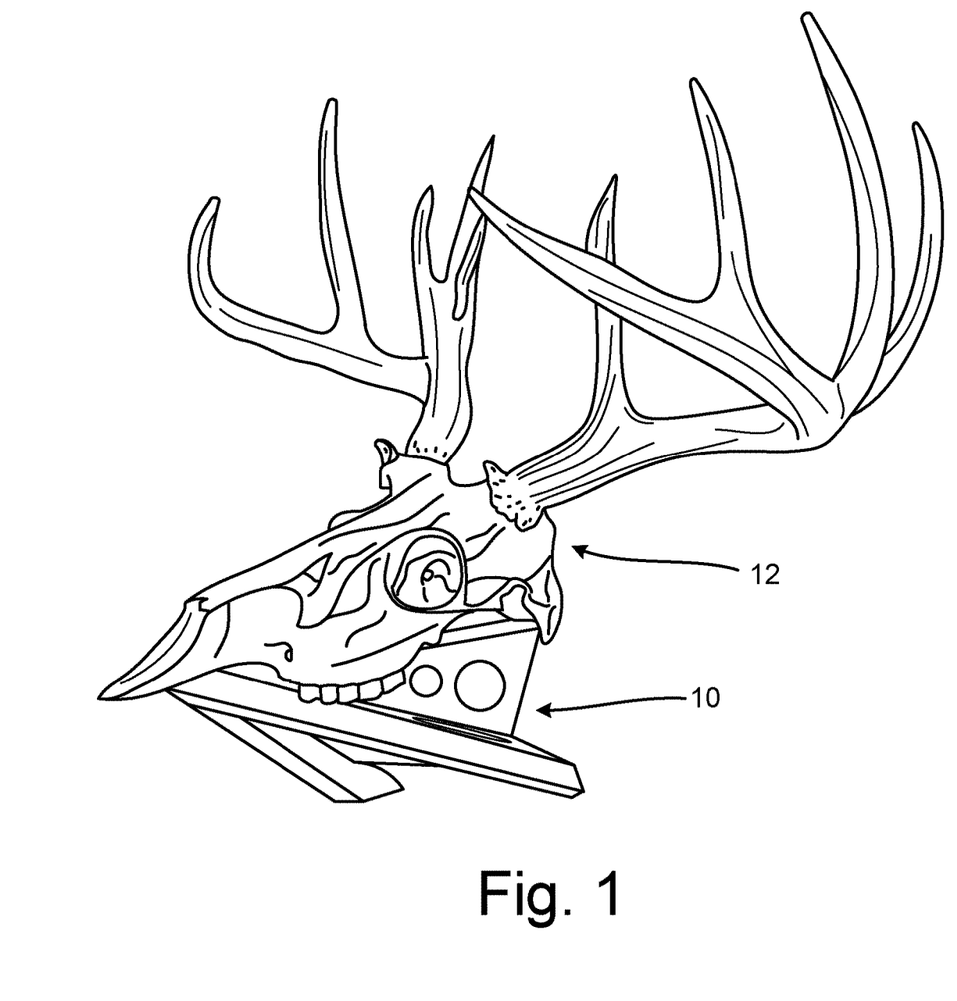
FIG. 1 is a perspective view of a skull mount with an attached animal skull.

FIG. 1 is a perspective view of skull mount 10 with an attached animal skull 12. Skull mount 10 is generally the shape of a broadhead arrow used for hunting wild game. Skull mount 10 is configured to support and display an attached animal skull 12 in both a first configuration and a second configuration. In the first configuration, animal skull 12 is attached to skull mount 10 and skull mount 10 is attached to a vertical surface, such as a wall or post. In the second configuration, animal skull 12 is attached to skull mount 10 and skull mount 10 is supported by a horizontal surface, such as a table or mantle. In the embodiment shown, animal skull 12 is a deer skull with antlers and animal skull 12 is attached to skull mount 10 to display the deer skull and antlers. In another embodiment, animal skull 12 can be any animal skull and skull mount 10 can display any animal skull, animal skull with antlers, animal skull with horns, and/or any life-like animal skull. Skull mount 10 is configured to switch between the first configuration and the second configuration without altering the attachment method or attachment location of animal skull 12 to skull mount 10, discussed further below.

Figure 2A:
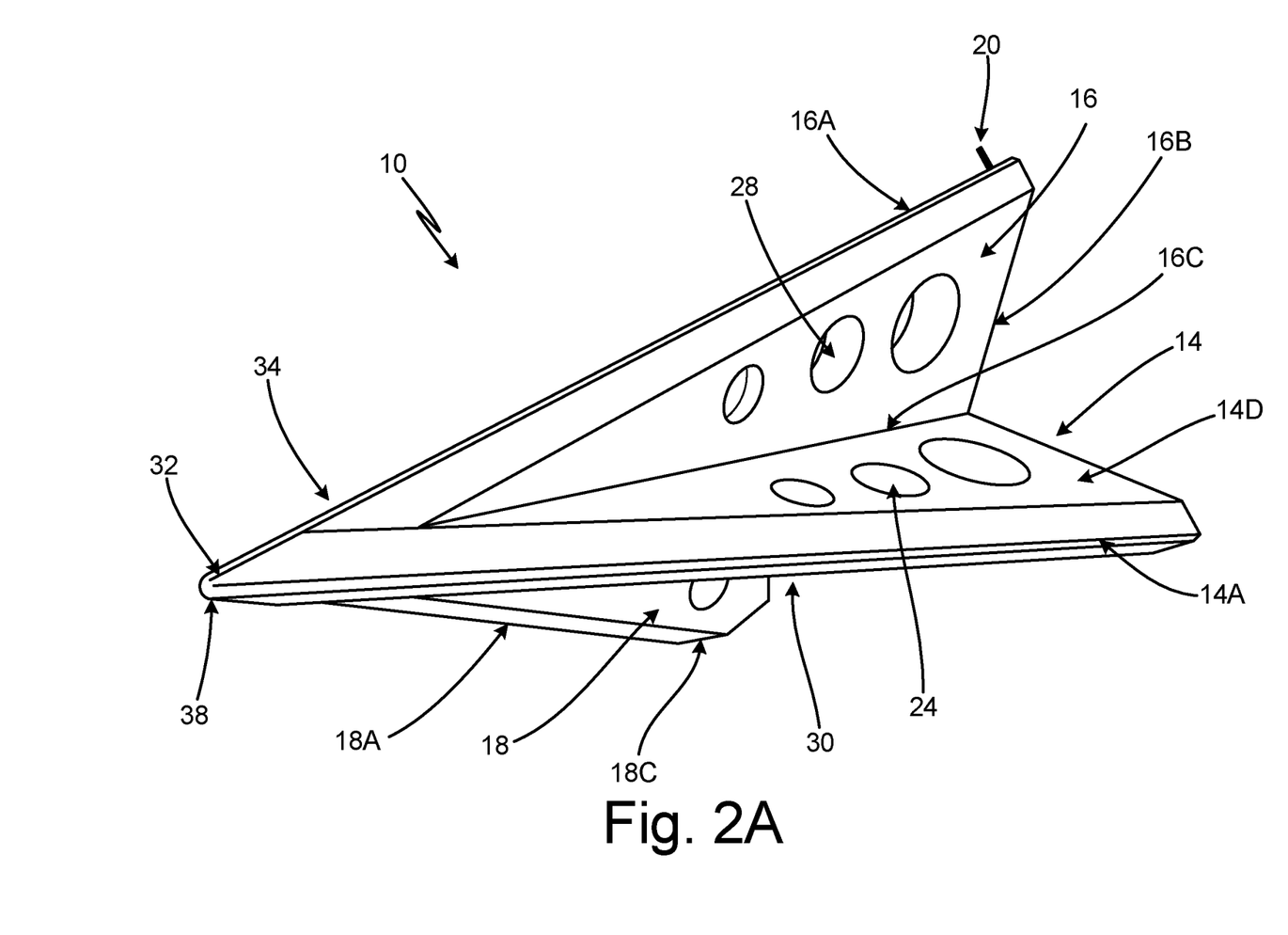
FIG. 2A is a front perspective view of the skull mount of FIG. 1.
Figure 2B:
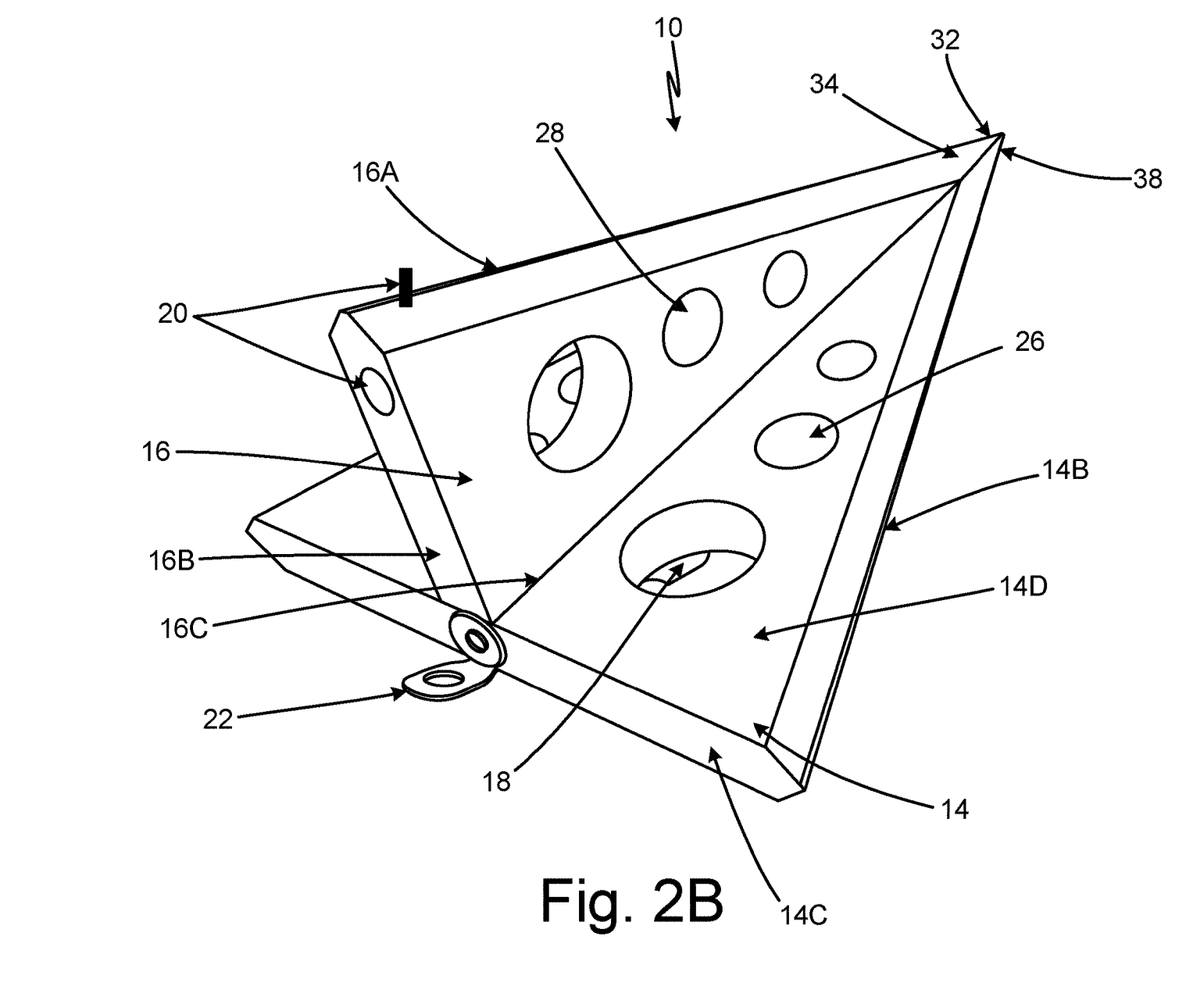
FIG. 2B is a rear perspective view of the skull mount of FIG. 1.
Figure 2C:
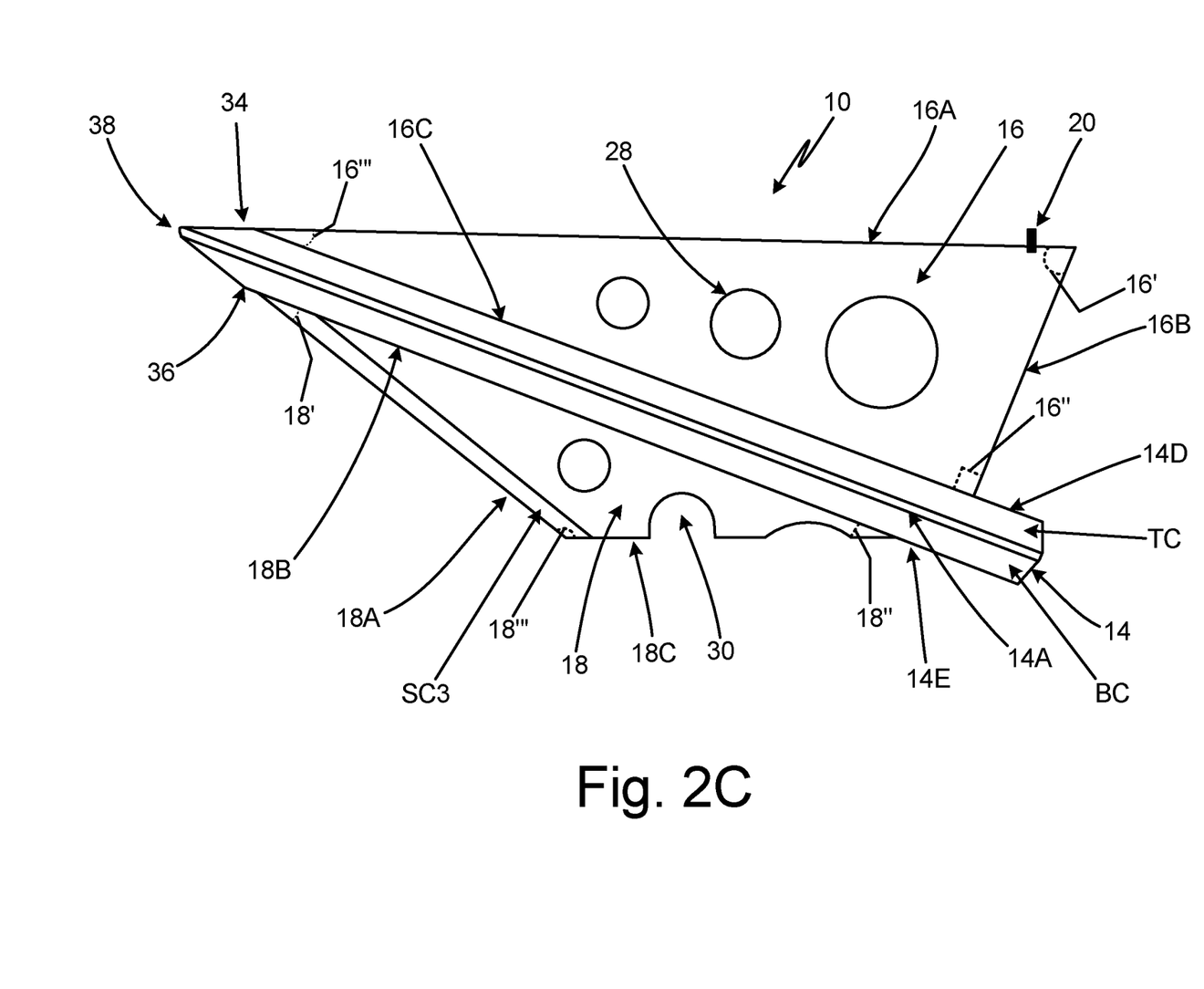
FIG. 2C is a side view of the skull mount of FIG. 1.
Figure 2D:
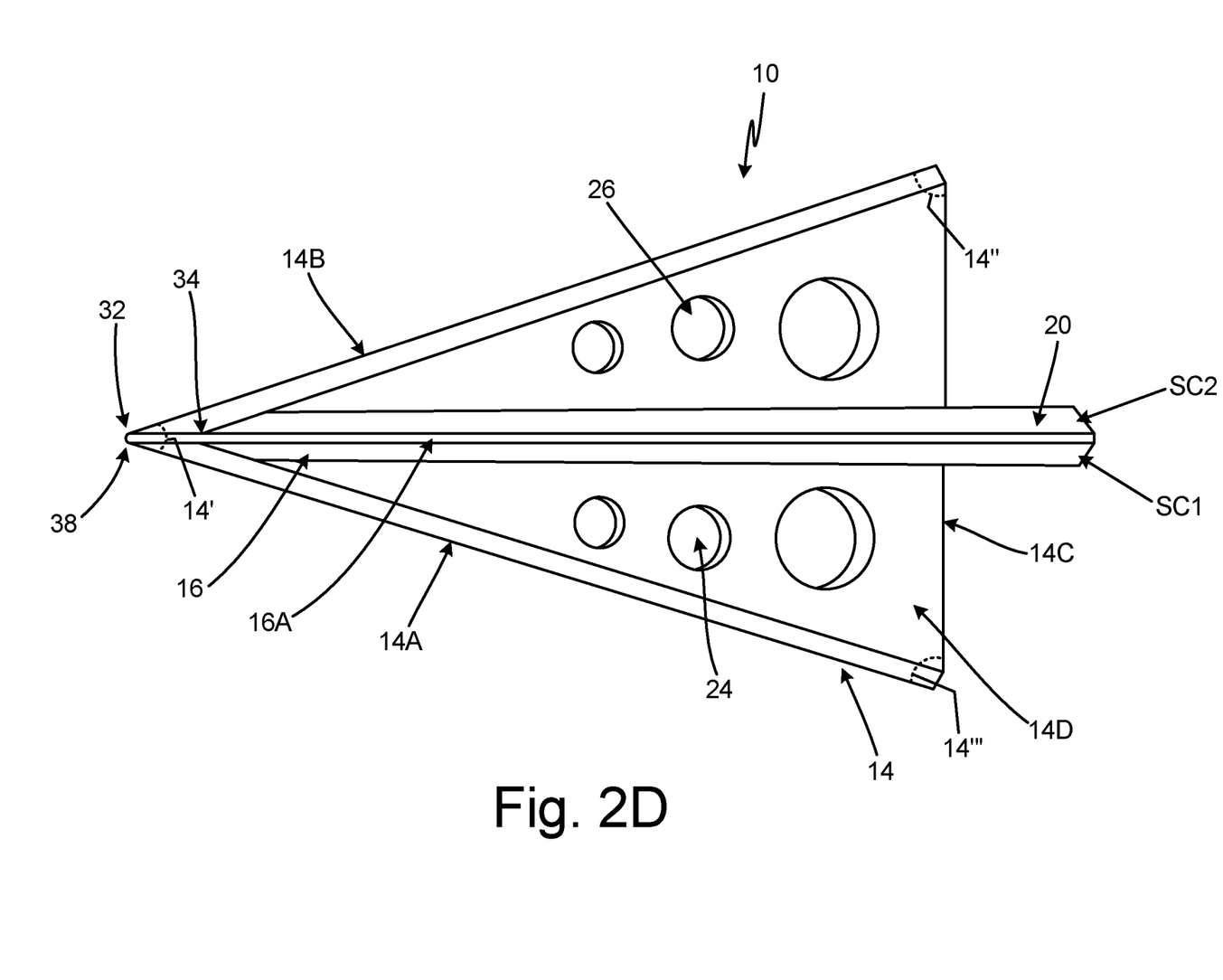
FIG. 2D is a top view of the skull mount of FIG. 1.

FIG. 2A is a front perspective view of skull mount 10. FIG. 2B is a rear perspective view of skull mount 10. FIG. 2C is a side view of skull mount 10. FIG. 2D is a top view of skull mount 10. FIGS. 2A-2D will be discussed together. Skull mount 10 includes body 14, support 16, base 18, attachment feature 20, and bracket 22. Body 14 includes first edge 14A, second edge 14B, third edge 14C, first surface 14D, second surface 14E, first angle 14', second angle 14", third angle 14'", first aperture 24, second aperture 26, and first point 32. Support 16 includes first edge 16A, second edge 16B, third edge 16C, first angle 16', second angle 16", third angle 16'", third aperture 28, and second point 34. Base 18 includes first edge 18A, second edge 18B, third edge 18C, first angle 18', second angle 18", third angle 18'", fourth aperture 30, and third point 36.

As best shown in FIG. 2D, body 14 is triangular in shape and includes first edge 14A, second edge 14B, third edge 14C, first surface 14D, second surface 14E, first angle 14', second angle 14", third angle 14'", first aperture 24, second aperture 26, and first point 32. First edge 14A extends between and connects second edge 14B to third edge 14C. Second edge 14B extends between and connects first edge 14A to third edge 14C. Third edge 14C extends between and connects first edge 14A to second edge 14B. In the embodiment shown first edge 14A and second edge 14B include top chamfer TC and bottom chamfer BC extending along a full length of each of first edge 14A and second edge 14B, respectively. In another embodiment, first edge 14A and second edge 14B may not include a chamfer, such that first edge 14A and second edge 14B include a right-angle or square edge.

First edge 14A and second edge 14B converge to form first angle 14', which is an acute angle. In one example, first angle 14' can be between 25 degrees and 55 degrees. Further, first edge 14A and second edge 14B converge to form first point 32. Second edge 14B and third edge 14C converge to form second angle 14", which is an acute angle. In one example, second angle 14" can be between 55 degrees and 85 degrees. Third edge 14C and first edge 14A converge to form third angle 14''', which is an acute angle. In one example, third angle 14''' can be between 55 degrees and 85 degrees. Body 14 also includes first surface 14D and second surface 14E. First surface 14D is a top surface of body 14 when skull mount 10 is resting on a horizontal surface and second surface 14E is a bottom surface of body 14 when skull mount 10 is resting on a horizontal surface. First surface 14D and second surface 14E are positioned opposite each other with respect to a plane extending through a center of the thickness of body 14.

First aperture 24 and second aperture 26 extend fully through body 14 from first surface 14D to second surface 14E. First aperture 24 is positioned adjacent first edge 14A and second aperture 26 is positioned adjacent second edge 14B. First aperture 24 and second aperture 26 are decorative apertures and can be positioned anywhere on body 14. In the embodiment shown, first aperture 24, second aperture 26, and the other apertures shown extending through body 14 are circular in shape. In another embodiment, first aperture 24 and second aperture 26 can have any shape, design, and/or size and first aperture 24 and second aperture 26 are not limited to only geometric shapes. Body 14 is the main structural component of skull mount 10 and body 14 is configured to provide surfaces to couple support 16 and base 18.

As best shown in FIG. 2C, support 16 is triangular in shape and includes first edge 16A, second edge 16B, third edge 16C, first angle 16', second angle 16", third angle 16''', third aperture 28, and second point 34. First edge 16A extends between and connects second edge 16B to third edge 16C. Second edge 16B extends between and connects first edge 16A to third edge 16C. Third edge 16C extends between and connects first edge 16A to second edge 16B. In the embodiment shown, first edge 16A includes side chamfers SC1, SC2 extending along a full length of both sides of first edge 16A. In another embodiment, first edge 16A may not include side chamfers, such that first edge 16A includes a right-angle or square edge. Second edge 16B and third edge 16C do not include chamfers extending along their respective edges, but instead each include right-angle or square edges extending the full length of each of second edge 16B and third edge 16C.

First edge 16A and second edge 16B converge to form first angle 16', which is an acute angle. In one example, first angle 16' can be between 55 degrees and 85 degrees. Second edge 16B and third edge 16C converge to form second angle 16", which is a right angle. Third edge 16C and first edge 16A converge to form third angle 16''', which is an acute angle. In one example, third angle 16''' can be between 5 degrees and 35 degrees. Further, first edge 16A and third edge 16C converge to form second point 34. Third aperture 28 extends fully through support 16, adjacent first edge 16A of support 16. Third aperture 28 is a decorative aperture that can be positioned anywhere on support 16. In the embodiment shown, third aperture 28 is circular in shape. In another embodiment, third aperture 28 can have any shape, design, and/or size and third aperture 28 is not limited to only geometric shapes.

Support 16 is coupled to body 14 along a full length of third edge 16C, such that support 16 is perpendicular to first surface 14D of body 14. More specifically, the square edge of third edge 16C is adjacent and abuts first surface 14D along a full length of third edge 16C. Support 16 is coupled to body 14 such that second edge 16B is aligned and parallel with third edge 14C of body 14. Support 16 can be coupled to body 14 using an adhesive, a fastener, welding, soldering, or any other method to join components together. In another embodiment, body 14 and support 16 can be of unitary construction in which body 14 and support 16 are additively manufactured, cast, machined, or injection-molded to form a single-piece component.

As best shown in FIG. 2C, base 18 is generally triangular in shape and includes first edge 18A, second edge 18B, third edge 18C, first angle 18', second angle 18", third angle 18''', fourth aperture 30, and third point 36. First edge 18A extends between and connects second edge 18B to third edge 18C. Second edge 18B extends between and connects first edge 18A to third edge 18C. Third edge 18C extends between and connects first edge 18A to second edge 18B. In the embodiment shown, first edge 18A includes side chamfers SC3, SC4 extending along a full length of both sides of first edge 18A. In another embodiment, first edge 18A may not include side chamfers, such that first edge 18A includes a right-angle or square edge. Second edge 18B and third edge 18C do not include chamfers extending along their edges, but instead each include right-angle or square edges extending the full length of each of second edge 18B and third edge 18C.

First edge 18A and second edge 18B converge to form first angle 18', which is an acute angle. In one example, first angle 18' can be between 5 degrees and 35 degrees. Further, first edge 18A and second edge 18B converge to form third point 36. Second edge 18B and third edge 18C converge to form second angle 18", which is an acute angle. In one example, second angle 18" can be between 5 degrees and 35 degrees. Third edge 18C and first edge 18A converge to form third angle 18''', which is an obtuse angle. In one example, third angle 18''' can be between 125 degrees and 155 degrees. The obtuse angle of third angle 18''' allows third edge 18C to abut either a horizontal surface or vertical surface while maintaining the desired viewing angle of animal skull 12 mounted on skull mount 10. Fourth aperture 30 extends fully through base 18, adjacent and extending through third edge 18C of base 18. Fourth aperture 30 is a decorative aperture that can be positioned anywhere on base 18. In the embodiment shown, fourth aperture 30 extends through third edge 18C of base 18. In another embodiment, fourth aperture 30 may not extend through third edge 18C of base 18. Further, in the embodiment shown, fourth aperture 30 is generally circular in shape. In another embodiment, fourth aperture 30 can have any shape, design, and/or size and fourth aperture 30 is not limited to only geometric shapes.

Base 18 is coupled to body 14 along a full length of second edge 18B, such that base 18 is perpendicular to second surface 14E of body 14. More specifically, the square edge of second edge 18B is adjacent and abuts second surface 14E along a full length of second edge 18B. Base 18 can be coupled to body 14 using an adhesive, a fastener, welding, soldering, or any other method to join components together. In another embodiment, body 14 and base 18 can be of unitary construction in which body 14 and base 18 are additively manufactured, cast, machined, or injection-molded to form a single-piece component.

As best shown in FIGS. 2A-2B, attachment feature 20 extends outwardly from first edge 16A of support 16, adjacent first angle 16' formed between first edge 16A and second edge 16B of support 16. More specifically, attachment feature 20 extends through second edge 16B of support 16, attachment feature 20 extends through first edge 16A of support 16, and attachment feature 20 extends outwardly from first edge 16A of support 16. Attachment feature 20 is configured to secure animal skull 12 to skull mount 10. In the embodiment shown, attachment feature 20 is a self-tapping screw that is configured to thread into animal skull 12 to secure animal skull 12 to skull mount 10. More specifically, attachment feature 20 is inserted into an aperture within second edge 16B of support 16, attachment feature 20 is pushed through the aperture until a tip of attachment feature 20 reaches first edge 16A of support 16, and then attachment feature 20 is screwed/threaded into animal skull 12 using a drill or other suitable means 12 to secure animal skull 12 to skull mount 10. In the embodiment shown, attachment feature 20 is a self-tapping screw. In another embodiment, attachment feature 20 can be a clamp, a bracket, a Velcro strip, or an adhesive suitable to secure animal skull 12 to skull mount 10 and prevent movement of animal skull 12 while coupled to skull mount 10.

As shown in FIG. 2B, bracket 22 is coupled to and extends outwards from third edge 14C of body 14. More specifically, bracket 22 is coupled to third edge 14C at a center vertical plane of body 14, wherein the center vertical plane of body 14 extends from a middle of third edge 14C of body 14 to first point 32 of body 14. In the embodiment shown, bracket 22 is coupled to body 14 through a fastener extending through bracket 22 and extending into a portion of body 14. In another embodiment, bracket 22 can be coupled to body 14 through a clamp, an adhesive, or bracket 22 can be integrally formed with body 14. The portion of bracket 22 extending outwards from third edge 14C of body 14 is parallel to and flush with third edge 18C of base 18. A portion of bracket 22 is flush with third edge 18C of base 18 to ensure that bracket 22 is situated flat against either a horizontal surface or a vertical surface when skull mount 10 is positioned in a horizontal configuration and a vertical configuration, respectively. In the embodiment shown, bracket 22 includes an aperture extending through the portion of bracket 22 extending outwards from third edge 14C of body 14. The aperture within bracket 22 is configured to receive a fastener coupled to and extending from a vertical surface to secure skull mount 10 to a vertical surface, when in the vertical configuration. In another embodiment, bracket 22 can include a hook, a lip, a ledge, or other feature configured to receive a fastener to secure skull mount 10 to a vertical surface when in the vertical configuration. In yet another embodiment, bracket 22 can be replaced with a Velcro strip or an adhesive, such as 3M Removable Mounting Strips, to secure skull mount 10 to a vertical surface when in the vertical configuration. In yet another embodiment, bracket 22 can be replaced with an adjustable screw attached to skull mount 10 to allow a user to adjust the angle, with respect to the mounting or support surface, of skull mount 10 to orient the attached animal skull 12 as desired by the user. Bracket 22 (or Velcro strip/adhesive/adjustable screw) is configured to secure skull mount 10 to a vertical surface when skull mount 10 is positioned in the vertical configuration.

When animal skull 12 is coupled to skull mount 10 for displaying animal skull 12, some surfaces of skull mount 10 are in contact with other surfaces and other surfaces are free from contact. More specifically, first edge 14A and second edge 14B of body 14 are free from contact when skull mount 10 is supporting animal skull 12. Third edge 14C of body 14 is in contact with a mounting or support surface when animal skull 12 is coupled to skull mount 10. First edge 16A and second edge 16B of support 16 are in contact with animal skull 12 when animal skull 12 is coupled to and supported by skull mount 10. Third edge 16C of support 16 is coupled to body 14 along a center plane of body 14 extending from a middle of third edge 14C of body 14 to first point 32 of body 14. First edge 18A of base 18 is free from contact when animal skull 12 is coupled to and supported by skull mount 10. Second edge 18B of base 18 is coupled to body 14 along a center plane of body 14 extending from a middle of third edge 14C of body 14 to first point 32 of body 14. Third edge 18C of base 18 is in contact with a mounting or support surface when animal skull 12 is coupled to and supported by skull mount 12. In the embodiment shown, specific edges and surfaces are described as either in contact or not in contact with other surfaces. In another embodiment, the specific edges and surfaces may or may not be in contact with other surfaces while skull mount 10 can still support animal skull 12.

Skull mount 10 is generally the shape of a broadhead arrow used for hunting wild game. As described above, skull mount 10 includes first point 32, second point 34, and third point 36. Each of first point 32, second point 34, and third point 36 converge to a single common point 38 at one end of skull mount 10. The other end of skull mount 10 opposite common point 38 is a flat end that is perpendicular to first surface 14D of body 14. Common point 38 at one end of skull mount 10 and the flat end opposite common point 38 together produce the broadhead arrow shape of skull mount 10. Skull mount 10 can be constructed from one or more of a metallic material, a wooden material, or a composite material. Further, skull mount 10 is mirrored about a plane extending through a center of first edge 16A, second edge 16B, and third edge 16C of support 16, resulting in a symmetrically shaped skull mount 10.

Skull mount 10 is configured to support and display an attached animal skull 12 in both a horizontal configuration and a vertical configuration. Further, skull mount 10 is configured to convert or switch from the horizontal configuration to the vertical configuration without removing the attached animal skull 12 from skull mount 10. Likewise, skull mount 10 is configured to convert or switch from the vertical configuration to the horizontal configuration without removing the attached animal skull 12 from skull mount 10. The horizontal configuration comprises animal skull 12 attached to skull mount 10 through attachment feature 20 with third edge 18C of base 18 adjacent and abutting a horizontal surface, such as a table or mantle, to support skull mount 10 on the horizontal surface. The vertical configuration comprises animal skull 12 attached to skull mount 12 through attachment feature 20, third edge 18C of base 18 adjacent and abutting a vertical surface, such as a wall or post, and bracket 22 receiving a fastener to secure skull mount 10 to the vertical surface.

To convert or switch from the vertical configuration to the horizontal configuration, bracket 22 of skull mount 10 is slid over and removed from the fastener supporting and securing skull mount 10 to the vertical surface, with bracket 22 remaining attached to skull mount 10 during removal from the fastener. Skull mount 10 is then placed on a horizontal surface, with third edge 18C of base 18 supporting the weight of animal skull 12 and skull mount 10. During the converting or switching from the vertical configuration to the horizontal configuration, animal skull 12 remains coupled to skull mount 10 through attachment feature 20. In other words, animal skull 12 is not removed or detached from skull mount 10 when skull mount 10 with an attached animal skull 12 converts from the vertical configuration to the horizontal configuration. Likewise, when converting from the horizontal configuration to the vertical configuration, animal skull 12 remains attached to skull mount 10 throughout the converting process.

Attachment feature 20, bracket 22, and the broadhead arrow shape of skull mount 10 allows a user to easily convert or switch from the horizontal configuration to the vertical configuration, or vice versa, without removing animal skull 12 from skull mount 10. Further, in both the horizontal configuration and the vertical configuration, animal skull 12 is positioned and oriented at an appropriate angle for satisfactory viewing of animal skull 12. In both configurations, skull mount 10 with an attached animal skull 12 provides viewing and inspection of animal skull 12 from multiples angles to appreciate animal skull 12. The simplistic design of skull mount 10 provides easy assembly of animal skull 12 to skull mount 10 and easy attachment of skull mount 10 to either a horizontal surface or a vertical surface. Further, the simplistic design of skull mount 10 provides a convertible mounting system that is low cost, easy to use, and displays animal skull 12 in a realistic manner. Skull mount 10 provides the above described advantages over previous mounting systems and many more than will be appreciated by a user familiar with animal skull mounting systems.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A skull mount for supporting an animal skull, the skull mount comprising:
   a body having a triangular shape, the body comprising a first edge, a second edge, and a third edge, and wherein a bracket extends from the third edge of the body;
   a support having a triangular shape, the support comprising a first edge, a second edge, and a third edge, wherein the third edge of the support is coupled to the body, and wherein an attachment feature extends from the first edge of the support; and
   a base comprising a first edge, a second edge, and a third edge, wherein the second edge of the base is coupled to the body.

2. The skull mount of claim 1, wherein the body includes:
   a first angle formed between the first edge and the second edge that is an acute angle;
   a second angle formed between the second edge and the third edge that is an acute angle; and
   a third angle formed between the third edge and the first edge that is an acute angle.

3. The skull mount of claim 1, wherein the first edge of the body includes a chamfer extending along a full length of the first edge and the second edge of the body includes a chamfer extending along a full length of the second edge.

4. The skull mount of claim 1, wherein the first edge of the body and the second edge of the body are free from contact when the skull mount is supporting the animal skull, and wherein the third edge of the body is in contact with a mounting or support surface when the skull mount is supporting the attached animal skull.

5. The skull mount of claim 1, wherein the support includes:
   a first angle formed between the first edge and the second edge that is an acute angle;
   a second angle formed between the second edge and the third edge that is a right angle; and
   a third angle formed between the third edge and the first edge that is an acute angle.

6. The skull mount of claim 1, wherein:
   the attachment feature extends through the second edge of the support, through the first edge of the support, and extends outwards from the first edge of the support;
   the attachment feature is configured to secure the animal skull to the skull mount; and
   the attachment feature is a self-tapping screw configured to screw into the animal skull to secure the animal skull to the skull mount.

7. The skull mount of claim 1, wherein the first edge of the support includes a chamfer extending along a full length of the first edge.

8. The skull mount of claim 1, wherein:
   the first edge of the support and the second edge of the support are in contact with the animal skull when the animal skull is attached to the skull mount; and
   the third edge of the support is attached to the body at a center plane of the body extending from a middle of the third edge of the body to a point formed by an intersection of the first edge and second edge of the body.

9. The skull mount of claim 1, wherein the base includes:
   a first angle formed between the first edge and the second edge that is an acute angle;
   a second angle formed between the second edge and the third edge that is an acute angle; and
   a third angle formed between the third edge and the first edge that is an obtuse angle.

10. The skull mount of claim 1, wherein the first edge of the base includes a chamfer extending along a full length of the first edge of the base.

11. The skull mount of claim 1, wherein:
    the first edge of the base is free from contact when the skull mount is supporting the attached animal skull;
    the second edge of the base is attached to the body at a center plane of the body extending from a middle of the third edge of the body to a point formed by an intersection of the first edge and second edge of the body; and
    the third edge of the base is in contact with a mounting or support surface when the skull mount is supporting the attached animal skull.

12. The skull mount of claim 1, wherein the bracket is coupled to the third edge of the body at a center plane of the body extending from a middle of the third edge of the body to a point formed by an intersection of the first edge and second edge of the body, and wherein the bracket is configured to receive a fastener.

13. The skull mount of claim 1, wherein:
    the first edge of the body and the second edge of the body converge to a first point;
    the first edge of the support and the third edge of the support converge to a second point;
    the first edge of the base and the second edge of the base converge to a third point; and
    each of the first point, the second point, and the third point converge to a single common point at an end of the skull mount.

14. The skull mount of claim 1, wherein the body has a first surface and a second surface opposite the first surface, and wherein the support is coupled to the first surface of the body and the base is coupled to the second surface of the body.

15. The skull mount of claim 1, wherein:
the skull mount converts from a vertical configuration to a horizontal configuration without removing the attached animal skull from the skull mount; and
the skull mount converts from the horizontal configuration to the vertical configuration without removing the attached animal skull from the skull mount.

16. The skull mount of claim 15, wherein:
the vertical configuration comprises the animal skull attached to the skull mount through the attachment feature, the third edge of the base abutting a vertical surface, and the bracket receiving a fastener extending from the vertical surface to secure the skull mount to the vertical surface; and
the horizontal configuration comprises the animal skull attached to the skull mount through the attachment feature and the third edge of the base abutting a horizontal surface to support the skull mount on the horizontal surface.

17. The skull mount of claim 1, wherein the skull mount is mirrored about a plane extending through a center of the first edge of the support, the second edge of the support, and the third edge of the support.

18. A broadhead arrow shaped skull mount for supporting an animal skull, the skull mount comprising:
a body comprising a first edge, a second edge, a third edge, a first surface, and a second surface, wherein the first surface and the second surface are positioned opposite each other with respect to a plane extending through a center of a thickness of the body;
a support comprising a first edge, a second edge, and a third edge, wherein the third edge of the support is coupled to the first surface of the body;
a base comprising a first edge, a second edge, and a third edge, wherein the second edge of the base is coupled to the second surface of the body;
an attachment feature extending outwards from the first edge of the support; and
a bracket extending outwards from the third edge of the body;
wherein a center plane of the support and a center plane of the base are in-line with a center plane of the body, and wherein the center plane of the body extends from a middle of the third edge of the body to a point formed by an intersection of the first edge and second edge of the body.

19. The skull mount of claim 18, wherein the first edge of the body and the second edge of the body are free from contact when the skull mount is supporting the animal skull, and wherein the third edge of the body is in contact with a mounting or support surface when the skull mount is supporting the attached animal skull.

20. The skull mount of claim 18, wherein the first edge of the support and the second edge of the support are in contact with the animal skull when the animal skull is attached to the skull mount.

21. The skull mount of claim 18, wherein:
the first edge of the base is free from contact when the skull mount is supporting the attached animal skull; and
the third edge of the base is in contact with a mounting or support surface when the skull mount is supporting the attached animal skull.

22. The skull mount of claim 18, wherein the attachment feature is configured to secure the animal skull to the skull mount, and wherein the attachment feature is a self-tapping screw configured to screw into the animal skull to secure the animal skull to the skull mount.

23. The skull mount of claim 18, wherein the bracket is coupled to the third edge of the body at the center plane of the body, and wherein the bracket is configured to receive a fastener.

24. The skull mount of claim 18, wherein:
the first edge of the body and the second edge of the body converge to a first point;
the first edge of the support and the third edge of the support converge to a second point;
the first edge of the base and the second edge of the base converge to a third point; and
each of the first point, the second point, and the third point converge to a single common point at an end of the skull mount.

25. The skull mount of claim 18, wherein:
the skull mount converts from a vertical configuration to a horizontal configuration without removing the attached animal skull from the skull mount; and
the skull mount converts from the horizontal configuration to the vertical configuration without removing the attached animal skull from the skull mount.

26. The skull mount of claim 25, wherein:
the vertical configuration comprises the animal skull attached to the skull mount through the attachment feature, the third edge of the base abutting a vertical surface, and the bracket receiving a fastener extending from the vertical surface to secure the skull mount to the vertical surface; and
the horizontal configuration comprises the animal skull attached to the skull mount through the attachment feature and the third edge of the base abutting a horizontal surface to support the skull mount on the horizontal surface.

27. The skull mount of claim 18, wherein the skull mount is mirrored about the center plane of the body.

* * * * *